(12) United States Patent
Latham et al.

(10) Patent No.: US 11,848,630 B2
(45) Date of Patent: Dec. 19, 2023

(54) LOW-SPEED WINDING RESISTANCE ESTIMATION OF VARIABLE SPEED MOTOR SYSTEMS

(71) Applicant: Haier US Appliance Solutions, Inc., Wilmington, DE (US)

(72) Inventors: Joseph Wilson Latham, Louisville, KY (US); Meher Prasadu Kollipara, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 125 days.

(21) Appl. No.: 17/324,477

(22) Filed: May 19, 2021

(65) Prior Publication Data
US 2022/0376639 A1 Nov. 24, 2022

(51) Int. Cl.
| | | |
|---|---|---|
| *H02P 21/16* | (2016.01) | |
| *D06F 34/14* | (2020.01) | |
| *D06F 23/04* | (2006.01) | |
| *D06F 37/30* | (2020.01) | |
| *D06F 34/08* | (2020.01) | |
| *H02P 21/18* | (2016.01) | |
| *H02P 21/22* | (2016.01) | |
| *H02P 21/13* | (2006.01) | |
| *D06F 103/24* | (2020.01) | |
| *D06F 105/48* | (2020.01) | |
| *D06F 103/46* | (2020.01) | |

(52) U.S. Cl.
CPC .............. *H02P 21/16* (2016.02); *D06F 23/04* (2013.01); *D06F 34/08* (2020.02); *D06F 34/14* (2020.02); *D06F 37/304* (2013.01); *H02P 21/13* (2013.01); *H02P 21/18* (2016.02); *H02P 21/22* (2016.02); *D06F 2103/24* (2020.02); *D06F 2103/46* (2020.02); *D06F 2105/48* (2020.02)

(58) Field of Classification Search
CPC ....................................................... H02P 21/16
See application file for complete search history.

(56) References Cited

U.S. PATENT DOCUMENTS

| | | |
|---|---|---|
| 7,071,649 B2 | 7/2006 | Kleinau |
| 7,199,549 B2 | 4/2007 | Ashok |

FOREIGN PATENT DOCUMENTS

| | | |
|---|---|---|
| CN | 102208894 B | 4/2013 |
| CN | 105119549 B | 9/2018 |
| ES | 2409004 T3 | 6/2013 |
| WO | WO2018103581 A1 | 6/2018 |

*Primary Examiner* — Jason Y Ko
(74) *Attorney, Agent, or Firm* — Dority & Manning, P.A.

(57) ABSTRACT

A motor system can include a motor configured to be operated according to at least a portion of an operation cycle specifying at least one target speed for the motor and a controller configured to obtain an estimated winding resistance of the motor, wherein the estimated winding resistance is determined based at least in part on an estimator gain factor, and wherein the estimator gain factor is inversely dependent on a speed of the motor; wherein the at least one target speed comprises at least one low speed such that at least a portion of the operation cycle is a low speed portion of the operation cycle, the at least one low speed having a speed of less than about 10 percent of a maximum speed of the operation cycle.

15 Claims, 8 Drawing Sheets

LOW-SPEED WINDING RESISTANCE ESTIMATION OF VARIABLE SPEED MOTOR SYSTEMS

FIELD

The present subject matter relates generally to low-speed winding resistance estimation of variable speed motor systems.

BACKGROUND

During operation of a motor, such as operation of a motor in an appliance, it can be desirable to observe speed (e.g., rotational speed) and/or angle (e.g., angular displacement) of the motor (e.g., of a rotor). One method for observing speed and/or angle of a motor is through the use of an observer that can model speed and angle of the rotor. Observer algorithms typically require an accurate estimation of winding resistance. Winding resistance can vary during operation of the motor, due to factors such as temperature, etc.

SUMMARY

Aspects and advantages of the invention will be set forth in part in the following description, or may be apparent from the description, or may be learned through practice of the invention.

One example aspect of the present disclosure is directed to a motor system. The motor system can include a motor configured to be operated according to at least a portion of an operation cycle specifying at least one target speed for the motor and a controller configured to obtain an estimated winding resistance of the motor, wherein the estimated winding resistance is determined based at least in part on an estimator gain factor, and wherein the estimator gain factor is inversely dependent on a speed of the motor; wherein the at least one target speed comprises at least one low speed such that at least a portion of the operation cycle is a low speed portion of the operation cycle, the at least one low speed having a speed of less than about 10 percent of a maximum speed of the operation cycle.

Another example aspect of the present disclosure is directed to a method for estimating winding resistance of a motor. The method can include operating the motor according to at least a portion of an operation cycle, the operation cycle specifying at least one target speed for the motor. The method can include, during operation of the motor according to at least the portion of the operation cycle, determining a change in an estimated winding resistance of the motor, wherein a magnitude of the change is based at least in part on an estimator gain factor, and wherein the estimator gain varies inversely with speed of the motor. The method can include determining the estimated winding resistance based at least in part on the change in the estimated winding resistance.

Another example aspect of the present disclosure is directed to a motorized appliance. The motorized appliance can include at least one motorized component and a motor system configured to drive the at least one motorized component. The motor system can include a motor configured to be operated according to at least a portion of an operation cycle specifying at least one target speed for the motor and a controller configured to obtain an estimated winding resistance of the motor, wherein the estimated winding resistance is determined based at least in part on an estimator gain factor, and wherein the estimator gain factor is inversely dependent on a speed of the motor; wherein the at least one target speed comprises at least one low speed such that at least a portion of the operation cycle is a low speed portion of the operation cycle, the at least one low speed having a speed of less than about 10 percent of a maximum speed of the operation cycle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
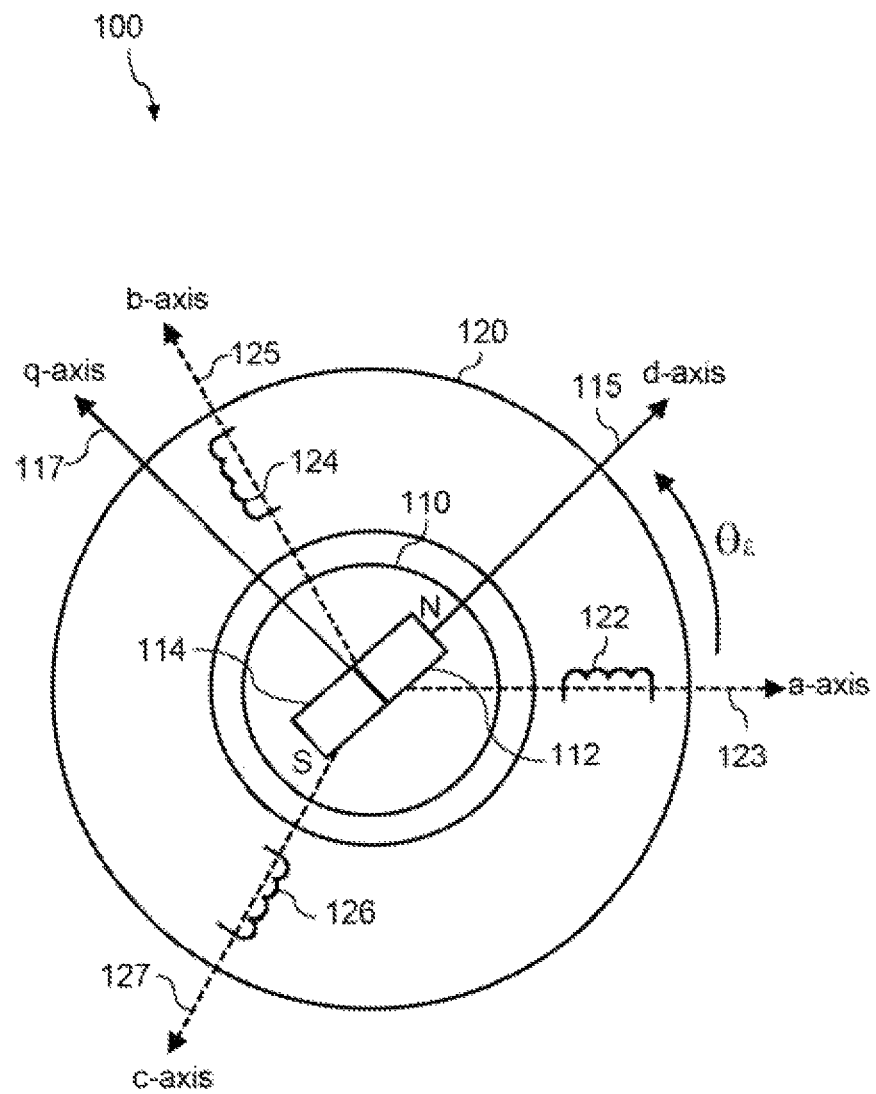
FIG. 1 depicts a schematic diagram of an example synchronous motor according to example embodiments of the present disclosure.

Repeat use of reference characters in the present specification and drawings is intended to represent the same or analogous features or elements of the present invention.

DETAILED DESCRIPTION

Reference now will be made in detail to embodiments of the present disclosure, one or more examples of which are illustrated in the drawings. Each example is provided by way of explanation, not limitation. In fact, it will be apparent to those skilled in the art that various modifications and variations can be made in the present invention without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

A motor refers to a class of electro-mechanical device that is capable of producing revolving motion in response to electrical signals. Motors typically include a stationary, and typically mounted, stator configured to encase or surround a rotor. The rotor and/or stator are electrically and/or magnetically charged to induce rotational motion between the rotor or stator. A variable speed motor refers to a class of motors in which the rotational speed of the rotor can be varied by modifying the timing at which windings in the rotor and/or stator are charged. One of ordinary skill in the art will understand that various motors exist in the state of the art, and those variations are within the scope of the present disclosure, when appropriate.

One exemplary class of motor is a synchronous motor. A synchronous motor is a motor that operates using alternating current (AC) and for which, at steady state, rotation is synchronized with a frequency of a supply current. As a result, the rotation period is equal to an integral number of AC cycles. Some synchronous motors include multiphase AC electromagnets on the stator of the motor that create a magnetic field which rotates in time with the oscillations of a line current. The rotor can include magnetic polarization such that the rotor turns in step with the stator field at the same rate and, as a result, provides the second synchronized rotating magnet field of any AC motor. Some synchronous motors, termed "permanent magnet synchronous motors" or PMSMs, include one or more permanent magnets (or other permanently-induced, nonvariant magnetic poles) at the rotor such that the rotor turns with the induced stator field. The motor may be included in a motorized appliance, such as a washing machine.

It is often desirable to obtain an accurate knowledge of winding resistance of a motor during operation of the motor. As one example, the winding resistance can be used in obtaining speed and/or angle feedback for efficient control of the motor. For instance, it is often desirable to know revolving speed (e.g., in degrees or radians per second), angular displacement/phase, and/or other characteristics for efficient control of the motor. As an example, the speed and/or angle information can be used in a feedback mechanism for efficient control of the motor. It is possible to measure such information through sensors. However, sensorless approaches, in which the characteristics are estimated by an observer (e.g., an observer algorithm) that determines the characteristics based on a model of the motor and measured electrical signals at the motor, have become popular due to a reduced cost and/or increased reliability compared to approaches utilizing movement or displacement sensors (e.g., speed and/or angle sensors). These sensorless approaches can require an accurate winding resistance estimation to produce useful outputs. For instance, accurate winding resistance can be useful and/or necessary to track rotor angle and/or speed to low speed. Furthermore, the winding resistance varies with temperature of the motor, so an accurate winding resistance estimation can often serve as a proxy for a temperature measurement of the motor, such as an alternative to direct temperature measurement (e.g., by a temperature sensor).

The winding resistance can vary during operation of the motor. For instance, the winding resistance may increase with temperature of the motor. As such, it is not desirable to use a constant for winding resistance, and it is desirable to obtain a variable estimate during operation of the motor. It can be difficult to determine the winding resistance directly from voltage and/or current feedback signals (e.g., of a sensorless observer) due to the presence of an uncertain back EMF term(s) in the dynamic equations. Therefore, it is easiest to estimate winding resistance by sensorless approaches when the motor is at a standstill, or having zero rotational speed. Unfortunately, bringing the motor to a standstill such that winding resistance can be measured often requires modifying an operation cycle of the motor. For instance, additional time must be dedicated in the operating cycle to decelerating the motor, obtaining the winding resistance measurement, then re-accelerating the motor to normal operation.

Example aspects of the present disclosure provide an improved solution for winding resistance estimation of a variable speed motor. In particular, example aspects of the present disclosure provide for obtaining a winding resistance estimate of a variable speed motor operating according to an operation cycle without requiring modification of the operation cycle to accommodate the winding resistance estimate. For instance, a winding resistance estimate can be obtained without requiring the motor to be brought to a standstill for the purposes of obtaining the winding resistance estimates. Example aspects of the present disclosure can be beneficial for motors operating according to operation cycles with low speed period(s), during which the motor is expected to be at low speeds relative to an average, maximum, or other suitable reference speed of the operation cycle. Example operation cycles with low speed period(s) can include washing machine cycles (e.g., agitate strokes).

The motor can be any suitable variable speed motor according to example aspects of the present disclosure, such as inverter-driven AC motors. As one example, the motor may be a permanent magnet synchronous motor, or PMSM. Some example aspects of the present disclosure are discussed herein with respect to a PMSM for the purposes of illustrating the example aspects. It should be understood that example aspects of the present disclosure can find application in other types of motors, and are not necessarily intended to be limited to a particular type of motor unless otherwise noted.

For instance, a standard voltage equation for a PMSM motor in the two-axis stationary frame (commonly denoted as αβ) is given in the below equation:

$$\begin{bmatrix} v_\alpha \\ v_\beta \end{bmatrix} = R_s \begin{bmatrix} I_\alpha \\ I_\beta \end{bmatrix} + L_s \begin{bmatrix} \dot{i}_\alpha \\ \dot{i}_\beta \end{bmatrix} + \lambda_m \omega_e \begin{bmatrix} -\sin\theta_e \\ \cos\theta_e \end{bmatrix}$$

where $\theta_e$ is the rotor flux electrical angle, $$\omega_e = \frac{d\theta_e}{dt}$$

is the rotor flux electrical speed, $R_s$ is the stator resistance, $L_s$ is the stator inductance, and $\lambda_m$ is the magnitude of the rotor flux linkage. The last terms in the above equation are known as back EMFS (electromotive force). The same voltage equations can be transferred into the synchronously rotating dq reference frame and are given by:

$$\begin{bmatrix} v_d \\ v_q \end{bmatrix} = \begin{bmatrix} R_s & -\omega_e L_s \\ \omega_e L_s & R_s \end{bmatrix} \begin{bmatrix} I_d \\ I_q \end{bmatrix} + L_s \begin{bmatrix} \dot{i}_d \\ \dot{i}_q \end{bmatrix} + \lambda_m \omega_e \begin{bmatrix} 0 \\ 1 \end{bmatrix}$$

where, in this case, the back EMF appears entirely in the quadrature axis.

For instance, permanent magnet synchronous motors may be driven by field oriented control (FOC), which provides for efficient and high-fidelity control. In field oriented control, a stator magnetic field is generated via a stator current provided through one or more stator windings at the stator. The stator field is oriented at a fixed angular offset ahead of a rotor magnetic field at the rotor. For instance, the rotor field may be produced by one or more permanent magnets or other permanent magnetic poles at the rotor. The angular offset between the rotor field and the stator field induces rotational motion at the rotor as the rotor field is made to be aligned with the stator field. By continually moving the stator field (e.g., per phases of the stator current), the rotor is made to synchronously rotate with the stator field.

This is explained with reference to FIG. 1. FIG. 1 depicts a schematic diagram of an example synchronous motor 100 according to example embodiments of the present disclosure. As illustrated, motor 100 includes rotor 110 and stator 120. Rotor 110 includes a north magnetic pole 112 and south magnetic pole 114. It should be understood that rotor 110 is discussed with reference to a single north magnetic pole 112 and a single south magnetic pole 114 for the purposes of illustration. Rotor 110 can include any suitable (e.g., balanced) number of north and south magnetic poles. The angle of the rotor magnetic field, represented by $\theta_e$, is related to a mechanical angle of the rotor, represented by $\theta_m$, by a number of rotor poles P. In particular, the angles are related by the equation:

$$\theta_e = \frac{P}{2}\theta_m.$$

In addition, the (mechanical) rotor speed, represented by $$\omega_m = \frac{d\theta_m}{dt},$$

can be related to the electrical rotor speed, represented by $$\omega_e = \frac{d\theta_e}{dt},$$

by the equation:

$$\omega_e = \frac{P}{2}\omega_m.$$

In operating the motor 100, three-phase power (e.g., current/voltage signals) can be provided at each of the stator windings 122, 124, and 126. For instance, stator winding 122 can be positioned along a-axis 123. Stator winding 124 can be positioned along b-axis 125 and can receive a power signal that is 120 degrees out of phase with the signal of stator winding 122. Additionally, stator winding 126 can be positioned along c-axis 127 and can receive a power signal that is −120 degrees or 240 degrees out of phase with stator winding 122. A convenient way to represent the behavior of the motor 100 is to treat the three-phase voltages and currents as rotating space vectors. The rotating space vectors can be broken up into cartesian components. A first component, termed the direct component or D component, can be in phase with the rotor magnetic field. This component is directed along the d-axis 115. A second component, termed the quadrature component or Q component, can be out of phase with the direct component, such as 90 degrees out of phase with the direct component. For instance, this component can be directed along the q-axis 117.

In particular, voltages and currents in the rotating-space dq reference frame can be translated from the three-phase abc reference frame by suitable transforms. For instance, one example set of transforms, the Park Transform and Clarke Transform, can be performed in cascade to convert between rotating-space and three-phase. In particular, an example Park Transform is given by:

$$\begin{bmatrix} d \\ q \end{bmatrix} = \begin{bmatrix} \cos\theta_e & \sin\theta_e \\ -\sin\theta_e & \cos\theta_e \end{bmatrix} \begin{bmatrix} \alpha \\ \beta \end{bmatrix}$$

and an example Clarke Transform is given by:

$$\begin{bmatrix} \alpha \\ \beta \end{bmatrix} = \begin{bmatrix} \frac{2}{3} & -\frac{1}{3} & -\frac{1}{3} \\ 0 & \frac{1}{\sqrt{3}} & -\frac{1}{\sqrt{3}} \end{bmatrix} \begin{bmatrix} a \\ b \\ c \end{bmatrix}$$

Note that alternate versions of the above transformations exist, accounting for variations in the location of a zero reference angle, whether the transformation preserves amplitude or power, etc.

In the dq frame, the electrical dynamics of the stator windings can be given by:

$$\begin{bmatrix} v_d \\ v_q \end{bmatrix} = \begin{bmatrix} R_s & -\omega_e L_q \\ \omega_e L_d & R_s \end{bmatrix} \begin{bmatrix} I_d \\ I_q \end{bmatrix} + \begin{bmatrix} L_d & 0 \\ 0 & L_q \end{bmatrix} \begin{bmatrix} \dot{I}_d \\ \dot{I}_q \end{bmatrix} + \lambda_m \omega_e \begin{bmatrix} 0 \\ 1 \end{bmatrix}$$

where $R_s$ is the resistance of the stator windings; $L_d$, $L_q$ are the d and q axis inductances of the stator windings, which may differ from each other based on the rotor construction; and $\lambda_m$ is the magnitude of the rotor magnetic flux linkage, which can be constant for a sinusoidal motor. The voltage term $\lambda_m \omega_e$ is known as the back electromotive force (EMF) (or counter-electromotive force), and, as can be seen in the above equation, has magnitude proportional to the rotor electrical speed $\omega_e$. Because the magnitude of the back EMF is proportional to rotor speed, at low speeds the resistive term can dominate the back EMF term in these voltage equations.

At least these reference frames can be used to design an observer. A general overview for observer design is given below. For instance, in an observer, estimates for the current derivative terms (İ), can be derived by solving the voltage equations for current derivative (İ), replacing unknown terms such as speed, flux, back EMF with estimates, and typically adding appropriate feedback error terms to stabilize the system. The resulting current derivative estimates ( İ) are then integrated to get current estimates (Î), which are then compared to the measured currents (I) to get error signals (Ĩ) to be used as feedback for updating observer estimates such as back EMF, flux, speed, angle, etc., as well as the current derivative estimates themselves. Other suitable observer designs can be employed according to example aspects of the present disclosure, and most if not all observer designs depend on some form of estimates including the winding resistance estimates.

The motor can be operated according to an operation cycle. Generally, the operation cycle can represent an operation plan of the motor over at least a period of time (and/or indefinitely). As one example, the operation cycle can define a plurality of target speeds, such as a sequence of target speeds, at which the motor is to be operated. The operation cycle may be implemented by speed control (e.g., matching actual speed of the motor to target speed) and/or by other suitable implementations, such as providing voltage and/or current signals relative to target voltage and/or current signals based at least in part on the operation cycle. The operation cycle can be software-based (e.g., stored in a memory of a controller of the motor) and/or hardware-based.

Lyapunov Analysis can be used to derive an adaptive estimate for the resistance given by the form:

$$\hat{R}_s = \int k_R I^T \tilde{I}$$

where $k_R$ is an arbitrary resistance estimate gain and I and $\tilde{I}$ are generic current and current error vectors, respectively, whose form depend on which reference frame the observer is being developed in. A negative sign may be included in the function depending on how the current errors are defined. In addition, fully realized resistance functions for observers in the $\alpha\beta$ and dq frames, respectively, are given in the below functions:

$$\hat{R}_s = \int k_R (I_\alpha \tilde{I}_\alpha + I_\beta \tilde{I}_\beta)$$

$$\hat{R}_s = \int k_R (I_d \tilde{I}_d + I_q \tilde{I}_q)$$

In order for the adaptive estimate to converge, $\hat{R}_s$ must replace $R_s$ in the current observer design. One problem with this adaptive resistance is that in some cases it is difficult for it to converge correctly while there are other unknowns in the current observer design, such as the back EMF. For example, in closed loop the d-axis current $I_d$ may be driven to zero, meaning that the resistive term only appears in the q-axis current function ($R_s I_q$). Furthermore, because the back EMF term also only appears in the q-axis function, and is presumably uncertain, it is difficult to differentiate the effect that each has on the q-axis current error. As a result, there is no guarantee that the values that the estimates converge to will be correct. Improper estimate values for resistance can result in inaccurate angle estimation, especially at low speeds. This can complicate operation of the motor.

According to example aspects of the present disclosure, however, the adaptive resistance can be updated at low speed, when the resistive term sufficiently dominates the back EMF term. For instance, the adaptive resistance estimate may have a convergence rate, and the convergence rate may be made greater at lower speeds and/or lesser at higher speeds. Thus, the adaptive resistance estimate can be restricted in cases where it would interfere with estimating the back EMF term or related terms (e.g., at higher speeds) and/or can be allowed to be more freely updated in conditions where the resistive term is dominant (e.g., at lower speeds). As used herein, a "low" speed is intended to refer to a speed that is relatively low given a range of speeds over which the motor is intended to operate (e.g., over an operation cycle of the motor). For example, a low speed may refer to a speed that is less than about 10 percent of a maximum speed of an operation cycle. As another example, a low speed may refer to a speed that is less than about 100 revolutions per minute.

As one example, the adaptive resistance estimate may be determined based at least in part on an adaptive resistance estimation function including the integral of an integrated term. The integrated term can include the multiplication (e.g., dot product) of winding current (e.g., a winding current vector) and winding current error (e.g., a winding current error vector). The integrated term may additionally be weighted by an estimator gain factor $k_R$. According to example aspects of the present disclosure, the estimator gain factor may be dependent on or otherwise based at least in part on speed of the motor (e.g., of the rotor). In particular, the estimator gain factor may be inversely dependent on speed. For instance, a value of the estimator gain factor may be greater at a lower speed and lesser at a higher speed. As one example, the estimator gain factor can include a gain constant $k_{R_0}$ in a numerator of the estimator gain factor and/or the speed or other speed-dependent term in a denominator of the estimator gain factor. For instance, the estimator gain factor may be modeled by the function:

$$k_R = \frac{k_{R_0}}{|\omega_e| + 1}$$

One example function for adaptive resistance update function is given by the following:

$$\hat{R}_s = \int \frac{k_{R_0}}{|\omega_e| + 1} I^T \tilde{I}$$

In this example implementation, the absolute value of the speed $\omega_e$ is used in the above to avoid a change in sign in the estimator as speed direction changes. Since in sensorless applications $\omega_e$ is unknown, it can be replaced with a suitable speed proxy or estimate, such as the estimated speed or the target speed. The denominator of the integral term includes a positive constant to avoid a divide by zero condition at zero rotational speed. For instance, the +1 in the denominator avoids a divide by zero when $|\omega_e|=0$, and any positive value could be used in its place.

The estimator gain factor and/or convergence rate of the adaptive resistance estimate may be inversely dependent on speed by any suitable manner. As one example, the adaptive resistance estimate may only be updated if the speed is below a maximum update speed threshold. For instance, digital logic, software, or other controls can be used to provide that a value of the resistance estimate is only modified if the speed is sufficiently low. As another example, a hardware and/or software model of the adaptive resistance estimate (e.g., an function model) may include an inverse speed term such that the magnitude of changes to the adaptive resistance estimate (e.g., an integrated term) varies inversely with speed. For instance, a denominator of an integrated term can include the speed. In some implementations, other speed-dependent terms, such as the back EMF, may be used in place of speed.

Systems and methods according to example aspects of the present disclosure provide a number of technical effects and benefits. For instance, systems and methods according to example aspects of the present disclosure can provide for improved winding resistance estimation. For instance, the winding resistance can be updated at points where the resistive term is dominant such that the convergence has a higher likelihood of being accurately attributed to the resistance. Additionally, the winding resistance can be accurately estimated without modifying an operation cycle of the motor. For instance, systems and methods according to example aspects of the present disclosure can provide for accurately estimating winding resistance without requiring modification of the operation cycle, such as without requiring an additional duration at which the motor is brought to zero speed for the purposes of measuring winding resistance. Alternatively, for instance, in the absence of an online method such as that according to the present disclosure, it can become necessary to include a DC stage in the operating cycle. In this stage, the inductive and back EMF terms are zeroed out and it is possible to calculate resistance directly from the voltage and current. However, the addition of such a stage adds time to the operating cycle.

The improved winding resistance estimation provided by example aspects of the present disclosure can have a number of benefits. For instance, this can provide for an observer algorithm to maintain good angle and/or speed tracking at low speeds. As an example, the observer algorithm can have improved resistance tracking, which can in turn provide for better distinguishing the contribution to the voltage equations from the back EMF term. This, in turn, can provide for improved low speed angle and/or speed tracking.

Additionally, the improved winding resistance can provide for monitoring the temperature of the motor windings. For instance, because the winding resistance changes with temperature, it is possible to estimate the temperature of the windings based on a known relationship between winding resistance and temperature. Improving the winding resistance estimate can thus provide for improved temperature measurement of the windings.

Figure 2:
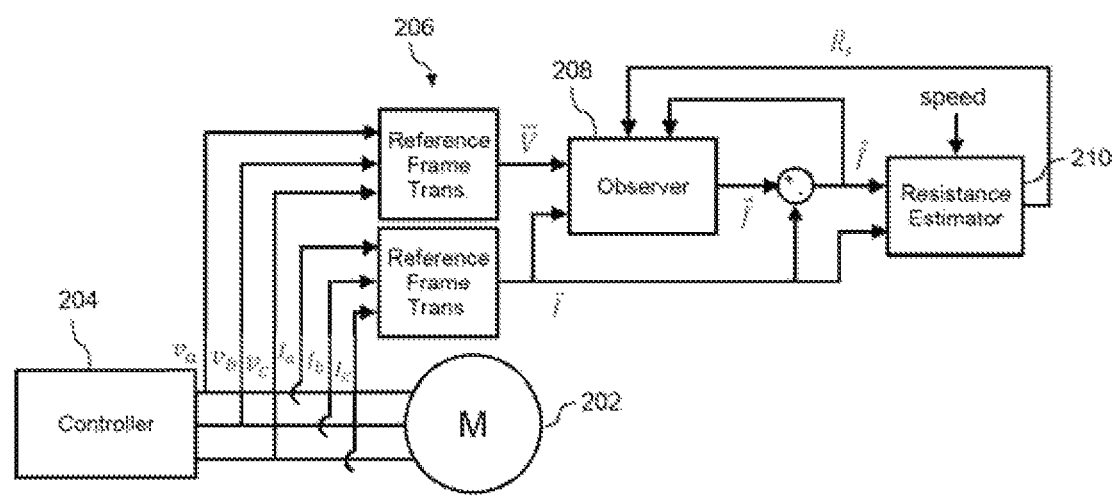
FIG. 2 depicts a block diagram of an example implementation of a motor system with improved winding resistance estimation according to example embodiments of the present disclosure.

FIG. 2 depicts a block diagram of an example implementation of a motor system 200 with improved winding resistance estimation according to example embodiments of the present disclosure. Motor 202 can be any suitable motor according to example aspects of the present disclosure, such as a variable speed motor. Controller 204 (e.g., a control algorithm) can provide voltage and/or current signals to windings at motor 202 such that the motor 202 produces rotational motion. As one example, the controller can supply three-phase voltage signals va, vb, and vc and/or three-phase current signals Ia, Ib, and Ic to stator windings at the motor 202 in synchronous timing such that a rotor at motor 202 rotates. The reference frame transformer 206 can be configured to transform the three-phase voltage and/or current signals into a rotating reference frame (e.g., the dq reference frame), such as by Park Transform and/or Clarke Transform. In some implementations, the reference frame transformer 206 may be omitted such that the system operates directly on three-phase voltage and/or current signals.

In addition, the motor system 200 can include observer algorithm 208. The observer 208 can estimate speed and/or angle of the motor 202 based on a model of motor 202 and values that are observed and/or estimated from the motor system 200. For example, the observer 208 can estimate speed and/or angle of motor 202 based at least in part on the transformed voltage and current signals from the reference frame transformer 206. In addition, the speed and angle of motor 202 can be estimated based at least in part on a resistance estimate, as described herein. For instance, resistance estimator 210 can produce an estimated resistance based at least in part on a current signal, a current error signal, and a speed dependent estimator gain, as described herein. The estimated resistance can be provided to the observer 208 such that the observer can produce accurate angle and/or speed estimates based on the estimated resistance.

Figure 3:
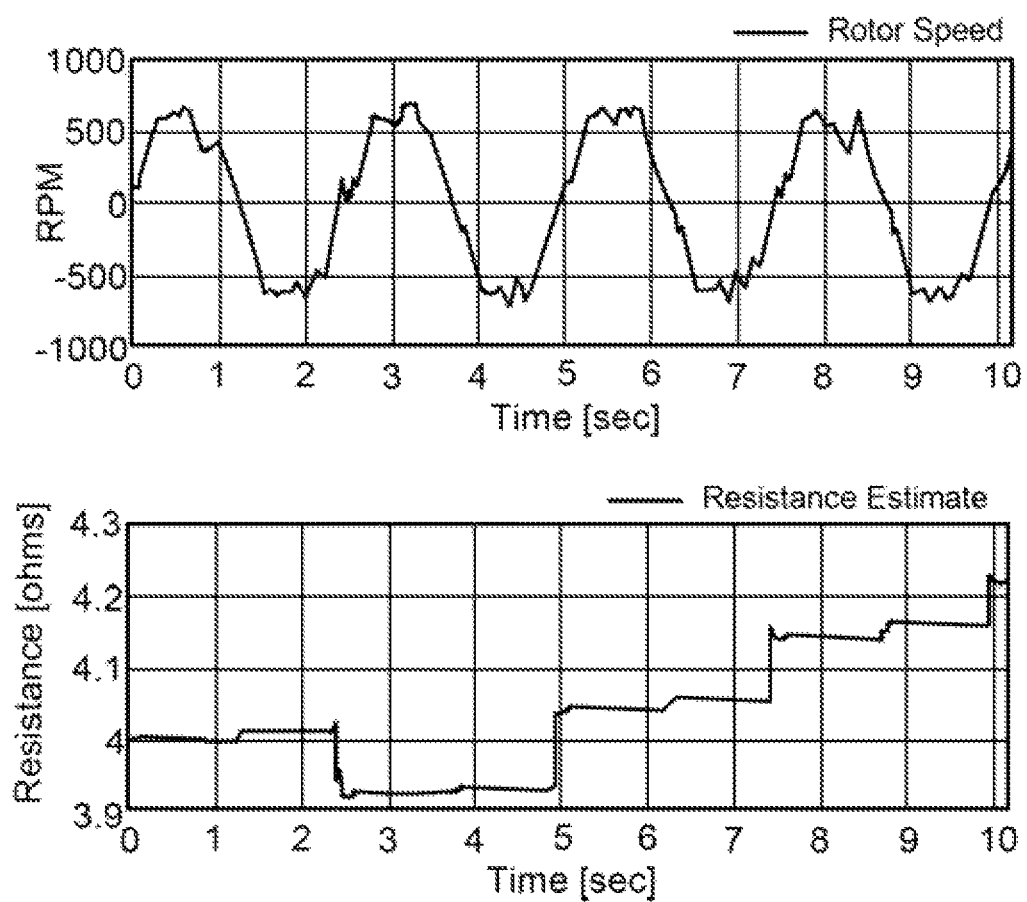
FIG. 3 depicts plots of results of example adaptive resistance estimator algorithms according to example embodiments of the present disclosure.

FIG. 3 depicts plots 300 of results of example adaptive resistance estimator algorithms according to example embodiments of the present disclosure. For instance, speed curve 302 depicts motor speed in revolutions per minute (RPM) over time. Resistance curve 304 depicts time-correlated resistance estimates (in ohms) produced by an adaptive resistance estimator algorithm according to example aspects of the present disclosure. As illustrated in FIG. 3, the resistance estimate is most active during lower-speed portions of the speed curve 302. Additionally, the resistance estimate remains relatively constant during higher-speed portions of the speed curve 302.

Figure 4:
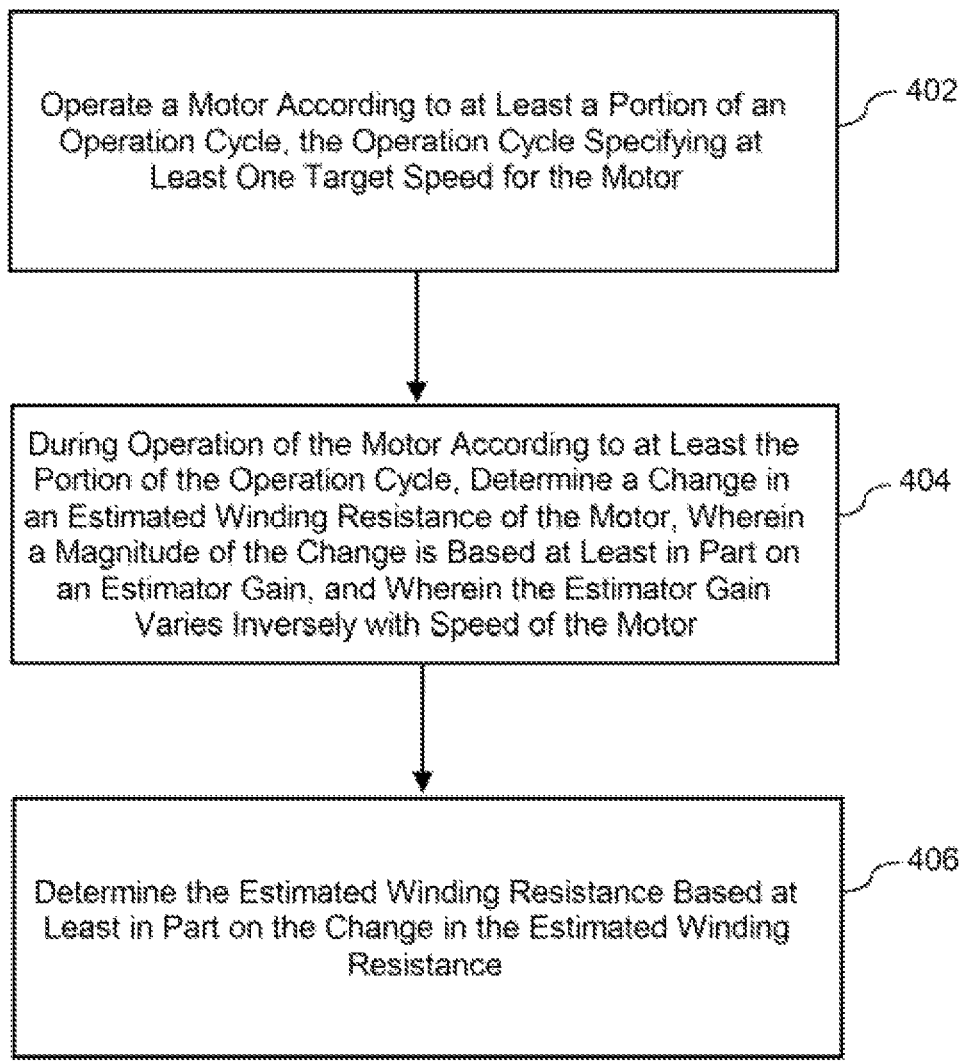
FIG. 4 depicts an example method for estimating winding resistance according to example embodiments of the present disclosure.

FIG. 4 depicts an example method 400 for estimating winding resistance according to example embodiments of the present disclosure. FIG. 4 depicts steps performed in a certain order for the purposes of illustration. One of ordinary skill in the art will understand that various steps illustrated herein can be rearranged, omitted, modified, etc. without departing from the scope of the present disclosure.

For instance, in some implementations, the method 400 can be implemented by a motor system. The motor system can include a motor configured to be operated according to at least a portion of an operation cycle specifying at least one target speed for the motor. For instance, the motor can be operated according to at least the portion of the operation cycle by providing at least one of a current signal or a voltage signal to the motor to operate the motor at the at least one target speed.

Additionally, the motor system can include a controller configured to obtain an estimated winding resistance of the motor. The estimated winding resistance can be determined based at least in part on an estimator gain factor. The estimator gain factor can be inversely dependent on a speed of the motor. In addition, the estimated winding resistance can be determined based at least in part on an adaptive resistance estimation function including the integral of an integrated term, the integrated term including a winding current, a winding current error, and the estimator gain factor. For instance, the integrated term can include the multiplication of the winding current and the winding current error. For instance, in some implementations, the winding current can be a winding current vector, the winding current error can be a winding current error vector, and the integrated term can include a dot product of the winding current vector and the winding current error. In some implementations, a denominator of the integrated term can include an absolute value of the speed of the rotor. In some implementations, a denominator of the integrated term can include a positive constant. In some implementations, the speed can be the target speed. In some implementations, the winding current is obtained from the motor and transformed to a rotating frame of reference.

The at least one target speed can include at least one low speed such that at least a portion of the operation cycle is a low speed portion of the operation cycle. For instance, the at least one low speed can be or can include a speed of less than about 10 percent of a maximum speed of the operation cycle. In some implementations, the estimator gain factor is zero when the speed of the rotor is greater than a maximum update speed threshold.

In some implementations, the controller is further configured to determine at least one of an estimated speed of the motor and/or estimated angle of the motor based at least in part on the estimated winding resistance. In some implementations, the controller is further configured to determine a temperature of the motor based at least in part on the estimated winding resistance.

In some implementations, the motor system can be included in a motorized appliance and configured to drive a motorized component. For instance, the motorized appliance can a washing machine, and the motorized component can be a wash basket. In some implementations, the controller can be configured to implement a wash cycle by the washing machine.

At 402, the method 400 can include operating a motor according to at least a portion of an operation cycle. For instance, the operation cycle can specify at least one target speed for the motor. In some implementations, operating the motor according to at least the portion of the operation cycle can include providing (e.g., by a controller algorithm) at least one of a current signal and/or a voltage signal to the motor to operate the motor at the at least one target speed.

At 404, the method 400 can include, during operation of the motor according to at least the portion of the operation cycle, determining a change in an estimated winding resistance of the motor. A magnitude of the change can be based at least in part on an estimator gain. The estimator gain can vary inversely with speed of the motor.

At 406, the method 400 can include determining the estimated winding resistance based at least in part on the change in the estimated winding resistance. For instance, the estimated winding resistance can be determined based on an integral of an integral term, and the change in the estimated winding resistance can be a step of the integral.

In some implementations, the method 400 can further include estimating at least one of motor angle and/or motor speed based at least in part on the estimated winding resistance. For instance, the motor angle and/or motor speed can be estimated based at least in part on an observer algorithm. As one example, the observer algorithm can be based in part on voltage dynamics of the motor.

In some implementations, the method 400 can further include estimating temperature of the motor based at least in part on the estimated winding resistance. For instance, the temperature of the motor can be determined based at least in part on a known relationship between the temperature of the motor and the estimated winding resistance. For instance, the estimated winding resistance can vary according to the known relationship with the temperature of the motor.

Figure 5:
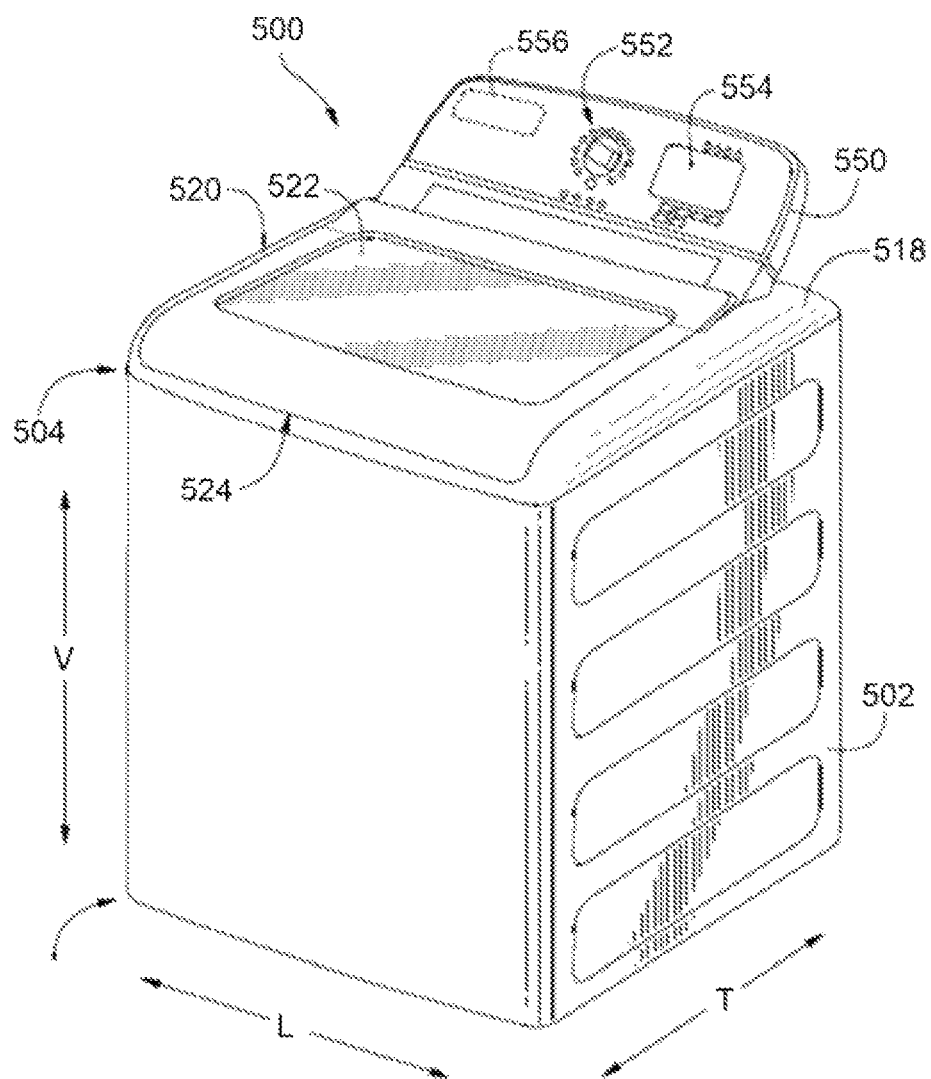
FIG. 5 depicts a perspective view of a washing machine appliance in a closed position according to example embodiments of the present disclosure.
Figure 6:
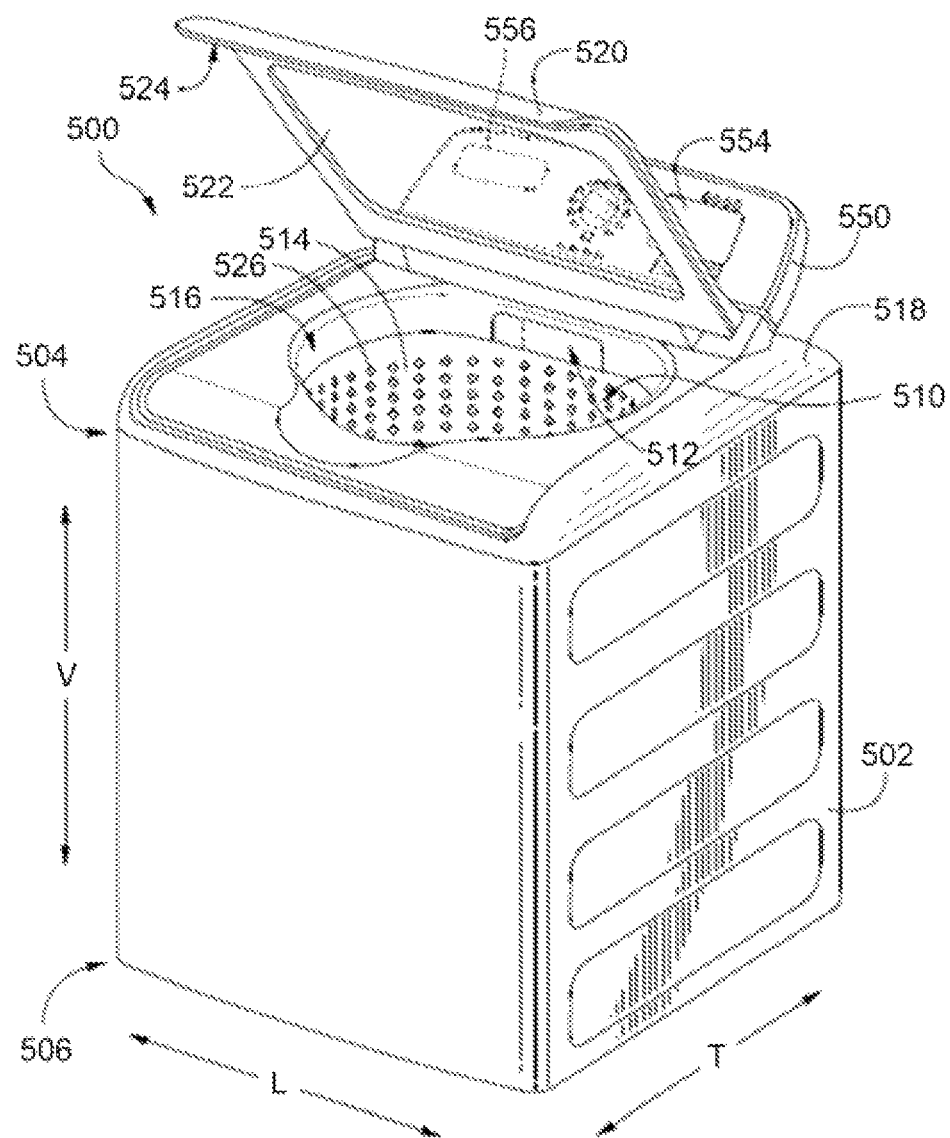
FIG. 6 depicts a perspective view of a washing machine appliance in an open position according to example embodiments of the present disclosure.
Figure 7:
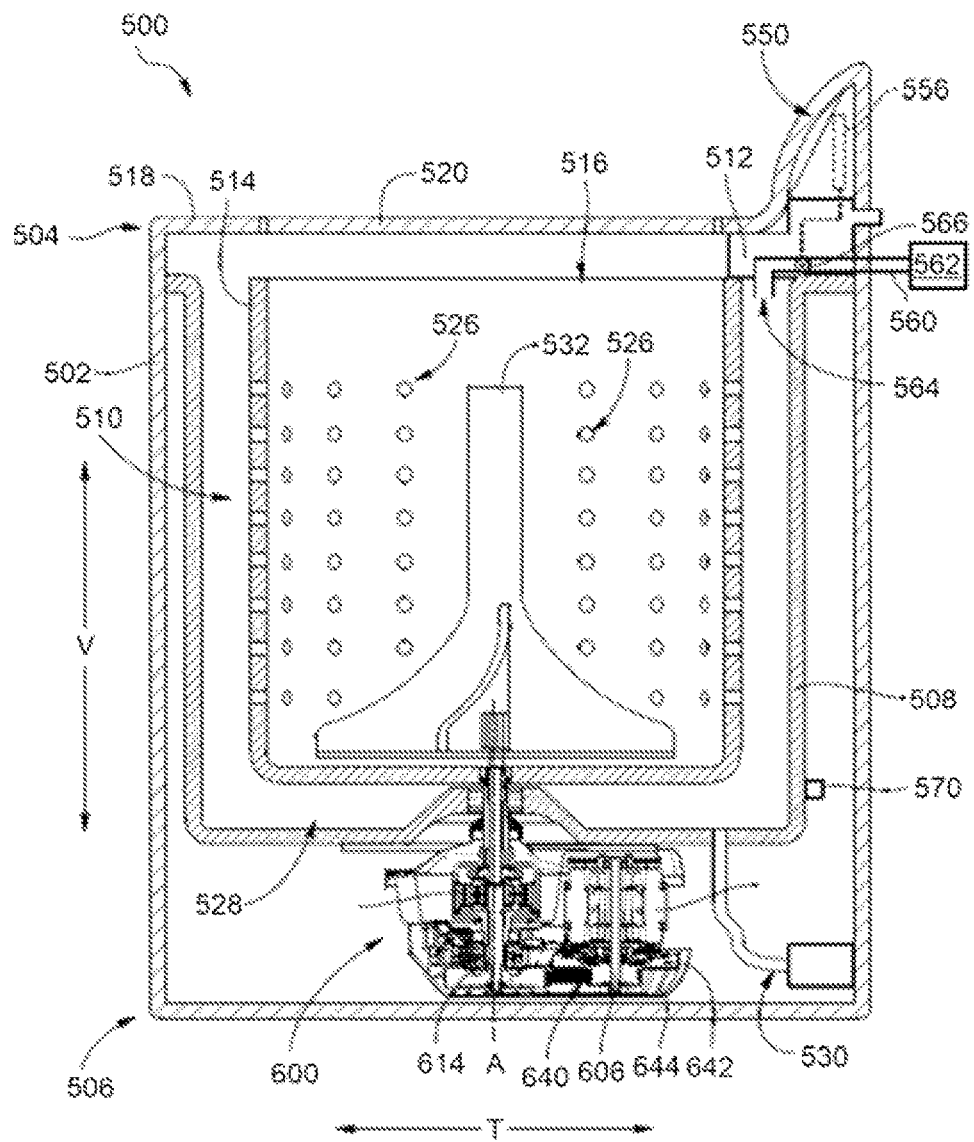
FIG. 7 depicts a side cross-sectional view of a washing machine appliance according to example embodiments of the present disclosure.

FIGS. 5 through 7 illustrate an exemplary embodiment of a vertical axis washing machine appliance 500. Specifically, FIGS. 5 and 6 illustrate perspective views of washing machine appliance 500 in a closed and an open position, respectively. FIG. 7 provides a side cross-sectional view of washing machine appliance 500. Washing machine appliance 500 generally defines a vertical direction V, a lateral direction L, and a transverse direction T, each of which is mutually perpendicular, such that an orthogonal coordinate system is generally defined.

While described in the context of a specific embodiment of vertical axis washing machine appliance 500, it should be appreciated that vertical axis washing machine appliance 500 is provided by way of example only. It will be understood that aspects of the present subject matter may be used in any other suitable washing machine appliance, such as a horizontal axis washing machine appliance. Indeed, modifications and variations may be made to washing machine appliance 500, including different configurations, different appearances, and/or different features while remaining within the scope of the present subject matter.

Washing machine appliance 500 has a cabinet 502 that extends between a top portion 504 and a bottom portion 506 along the vertical direction V, between a first side (left) and a second side (right) along the lateral direction L, and between a front and a rear along the transverse direction T. As best shown in FIG. 7, a wash tub 508 is positioned within cabinet 502, defines a wash chamber 510, and is generally configured for retaining wash fluids during an operating cycle. Washing machine appliance 500 further includes a primary dispenser 512 (FIG. 6) for dispensing wash fluid into wash tub 508. The term "wash fluid" refers to a liquid used for washing and/or rinsing articles during an operating cycle and may include any combination of water, detergent, fabric softener, bleach, and other wash additives or treatments.

In addition, washing machine appliance 500 includes a wash basket 514 that is positioned within wash tub 508 and generally defines an opening 516 for receipt of articles for washing. More specifically, wash basket 514 is rotatably mounted within wash tub 508 such that it is rotatable about an axis of rotation A. According to the illustrated embodiment, the axis of rotation A is substantially parallel to the vertical direction V. In this regard, washing machine appliance 500 is generally referred to as a "vertical axis" or "top load" washing machine appliance 500. However, it should be appreciated that aspects of the present subject matter may be used within the context of a horizontal axis or front load washing machine appliance as well.

As illustrated, cabinet 502 of washing machine appliance 500 has a top panel 518. Top panel 518 defines an opening (FIG. 6) that coincides with opening 516 of wash basket 514 to permit a user access to wash basket 514. Washing machine appliance 500 further includes a door 520 which is rotatably mounted to top panel 518 to permit selective access to opening 516. In particular, door 520 selectively rotates between the closed position (as shown in FIGS. 5 and 7) and the open position (as shown in FIG. 6). In the closed position, door 520 inhibits access to wash basket 514. Conversely, in the open position, a user can access wash basket 514. A window 522 in door 520 permits viewing of wash basket 514 when door 520 is in the closed position, e.g., during operation of washing machine appliance 500. Door 520 also includes a handle 524 that, e.g., a user may pull and/or lift when opening and closing door 520. Further, although door 520 is illustrated as mounted to top panel 518, door 520 may alternatively be mounted to cabinet 502 or any other suitable support.

As best shown in FIGS. 6 and 7, wash basket 514 further defines a plurality of perforations 526 to facilitate fluid communication between an interior of wash basket 514 and wash tub 508. In this regard, wash basket 514 is spaced apart from wash tub 508 to define a space for wash fluid to escape wash chamber 510. During a spin cycle, wash fluid within articles of clothing and within wash chamber 510 is urged through perforations 526 wherein it may collect in a sump 528 defined by wash tub 508. Washing machine appliance 500 further includes a pump assembly 530 (FIG. 7) that is located beneath wash tub 508 and wash basket 514 for gravity assisted flow when draining wash tub 508.

An impeller or agitation element 532 (FIG. 7), such as a vane agitator, impeller, auger, oscillatory basket mechanism, or some combination thereof is disposed in wash basket 514 to impart an oscillatory motion to articles and liquid in wash basket 514. More specifically, agitation element 532 extends into wash basket 514 and assists agitation of articles disposed within wash basket 514 during operation of washing machine appliance 500, e.g., to facilitate improved cleaning. In different embodiments, agitation element 532 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 7, agitation element 532 and wash basket 514 are oriented to rotate about axis of rotation A (which is substantially parallel to vertical direction V).

As best illustrated in FIG. 7, washing machine appliance 500 includes a motor assembly 600 (described in detail below) in mechanical communication with wash basket 514 to selectively rotate wash basket 514 (e.g., during an agitation or a rinse cycle of washing machine appliance 500). In addition, motor assembly 600 may also be in mechanical communication with agitation element 532. In this manner, motor assembly 600 may be configured for selectively rotating or oscillating wash basket 514 and/or agitation element 532 during various operating cycles of washing machine appliance 500.

Referring still to FIGS. 5 through 7, a control panel 550 with at least one input selector 552 (FIG. 5) extends from top panel 518. Control panel 550 and input selector 552 collectively form a user interface input for operator selection of machine cycles and features. A display 554 of control panel 550 indicates selected features, operation mode, a countdown timer, and/or other items of interest to appliance users regarding operation.

Operation of washing machine appliance 500 is controlled by a controller or processing device 556 that is operatively coupled to control panel 550 for user manipulation to select washing machine cycles and features. In response to user manipulation of control panel 550, controller 556 operates the various components of washing machine appliance 500 to execute selected machine cycles and features. According to an exemplary embodiment, controller 556 may include a memory and microprocessor, such as a general or special purpose microprocessor operable to execute programming instructions or micro-control code associated with methods described herein. Alternatively, controller 556 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 550 and other components of washing machine appliance 500 may be in communication with controller 556 via one or more signal lines or shared communication busses.

During operation of washing machine appliance 500, laundry items are loaded into wash basket 514 through opening 516, and washing operation is initiated through operator manipulation of input selectors 552. Wash basket 514 is filled with water and detergent and/or other fluid additives via primary dispenser 512. One or more valves can be controlled by washing machine appliance 500 to provide for filling wash tub 508 and wash basket 514 to the appropriate level for the amount of articles being washed and/or rinsed. By way of example for a wash mode, once wash basket 514 is properly filled with fluid, the contents of wash basket 514 can be agitated (e.g., with agitation element 532 as discussed previously) for washing of laundry items in wash basket 514.

More specifically, referring again to FIG. 7, a water fill process will be described according to an exemplary embodiment. As illustrated, washing machine appliance 500 includes a water supply conduit 560 that provides fluid communication between a water supply source 562 (such as a municipal water supply) and a discharge nozzle 564 for directing a flow of water into wash chamber 510. In addition, washing machine appliance 500 includes a water fill valve or water control valve 566 which is operably coupled to water supply conduit 560 and communicatively coupled to controller 556. In this manner, controller 556 may regulate the operation of water control valve 566 to regulate the amount of water within wash tub 508. In addition, washing machine appliance 500 may include one or more pressure sensors 570 for detecting the amount of water and or clothes within wash tub 508. For example, pressure sensor 570 may be operably coupled to a side of tub 508 for detecting the weight of wash tub 508, which controller 556 may use to determine a volume of water in wash chamber 510 and a subwasher load weight.

After wash tub 508 is filled and the agitation phase of the wash cycle is completed, wash basket 514 can be drained, e.g., by drain pump assembly 530. Laundry articles can then be rinsed by again adding fluid to wash basket 514 depending on the specifics of the cleaning cycle selected by a user. The impeller or agitation element 532 may again provide agitation within wash basket 514. One or more spin cycles may also be used as part of the cleaning process. In particular, a spin cycle may be applied after the wash cycle and/or after the rinse cycle in order to wring wash fluid from the articles being washed. During a spin cycle, wash basket 514 is rotated at relatively high speeds to help wring fluid from the laundry articles through perforations 526. After articles disposed in wash basket 514 are cleaned and/or washed, the user can remove the articles from wash basket 514, e.g., by reaching into wash basket 514 through opening 516.

Figure 8:
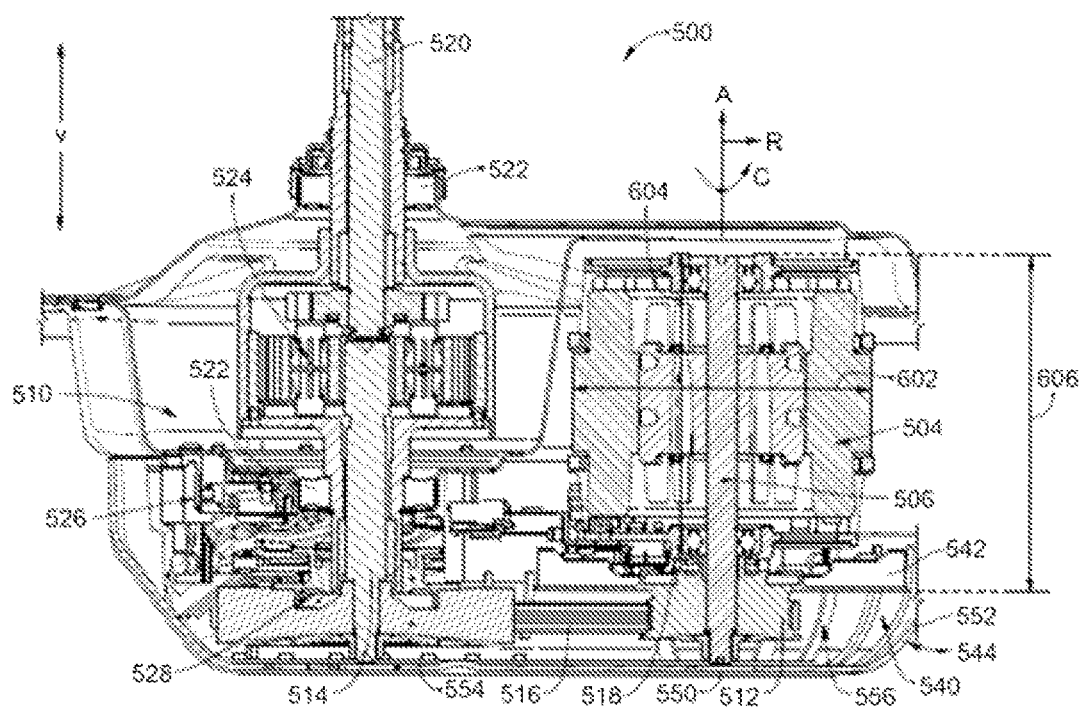
FIG. 8 depicts an example motor assembly according to example embodiments of the present disclosure.

Referring now to FIGS. 7 and 8, a motor assembly 600 will be described according to an exemplary embodiment of the present subject matter. Motor assembly 600 may be used with washing machine appliance 500, e.g., to facilitate rotation of wash basket 514 and/or agitation element 532, as described above. In addition, motor assembly 600 may be used in other washing machine appliances, including both vertical and horizontal axis washing machine appliances. As described in detail below, motor assembly 600 includes features for rotating wash basket 514 while also generating a flow of cooling air to help reduce the operating temperature of motor assembly 600, thereby expanding its overall operating envelope and performance capabilities. It should be appreciated that motor assembly 600 described herein is only an exemplary embodiment used to describe aspects of the present subject matter and is not intended to limit the scope of the present disclosure in any manner.

As shown, motor assembly 600 generally includes a drive motor 604 that is operably coupled to wash basket 514 for selectively rotating wash basket 514. More specifically, for example, drive motor 604 may include a motor shaft 606 that defines an axial direction A, a radial direction R, and a circumferential direction C. According to the exemplary embodiment, drive motor 604 is a vertically oriented, e.g., such that motor shaft 606 extends parallel to the vertical direction V of washing machine appliance 500 (i.e., such that axial direction A is parallel to the vertical direction V). However, it should be appreciated that aspects of the present subject matter may apply to any other suitable motor arrangement, e.g., such as a horizontally mounted motor assembly for a front load washing machine appliance.

As used herein, "motor" may refer to any suitable drive motor and/or transmission assembly for rotating wash basket 514. For example, drive motor 604 may be a brushless DC electric motor, a stepper motor, or any other suitable type or configuration of motor. For example, drive motor 604 may be an AC motor, an induction motor, a permanent magnet synchronous motor, or any other suitable type of AC motor. In addition, drive motor 604 may include any suitable transmission assemblies, clutch mechanisms, or other components. According to an exemplary embodiment, drive motor 604 may be operably coupled to controller 556, which is programmed to rotate wash basket 514 according to predetermined operating cycles, based on user inputs (e.g. via control panel 550 or input selectors 552), etc.

Motor assembly 600 may further include a transmission assembly 610 that is operably coupled to wash basket 514 and/or agitation element 532 for transmitting torque from motor shaft 606. In general, transmission assembly 610 may be any suitable mechanism or device suitable for utilizing the rotational motion of motor shaft 606 to rotate wash basket 514 and/or agitation element 532. Accordingly, aspects of the present subject matter are not limited to the specific transmission assembly 610 described herein according to an exemplary embodiment.

Specifically, as best shown in FIG. 8, transmission assembly 610 is a belt driven transmission. In this regard, transmission assembly 610 includes a drive pulley 612 that is directly mechanically coupled to motor shaft 606. Drive pulley 612 is generally configured for transmitting torque to an input shaft 614 of transmission assembly 610 via a drive belt 616. As shown, input shaft 614 and motor shaft 606 are both vertically oriented in parallel to each other. In addition, motor shaft 606 and drive pulley 612 both extend out of a bottom surface 618 of drive motor 604 and input shaft 614 extends from a bottom of wash basket 514 to a location proximate bottom 506 of cabinet 502. However, it should be appreciated that according to alternative embodiments, any other suitable motor and transmission configuration may be used.

Referring still to FIG. 8, input shaft 614 may be mechanically coupled to an output shaft 620 that is coupled to wash basket 514 and/or agitation element 532. More specifically, as shown, input shaft 614 and output shaft 620 are rotatably supported by one or more bearings 622 and are mechanically coupled through a gearbox 624, a mode shifter 626, and a clutch 628. In general, gearbox 624 includes a plurality of gears encased in a housing for altering the torque and/or speed transmitted from input shaft 614 to output shaft 620. In addition, mode shifter 626 may be any suitable mechanism, gear train, etc. that is generally configured for adjusting the rotating action of output shaft 620, e.g., to facilitate various agitation profiles or programs depending on the operating cycle of washing machine appliance 500. Clutch 628 may be any suitable device for selectively engaging or disengaging input shaft 614 and output shaft 620, e.g., for engaging and disengaging wash basket 514 and/or agitation element 532.

Notably, motor assembly 600 and transmission assembly 610 may operate together to facilitate multiple modes of operation of washing machine appliance 500. For example, during a wash cycle or an agitation cycle, wash basket 514 may remain stationary and agitation element 532 may oscillate back and forth according to any suitable agitation profile. This may be achieved, for example, by disengaging mode shifter 626 and/or clutch 628 to mechanically decouple wash basket 514 from drive belt 616 while operating drive motor 604 in a bi-directional, oscillating manner. By contrast, during a drain cycle or a spin cycle, wash basket 514 and agitation element 532 may rotate in the same direction at high speeds. This may be achieved, for example, by engaging mode shifter 626 and/or clutch 628 to mechanically couple wash basket 514 to drive belt 616 while operating drive motor 604 in a single direction. It should be appreciated that other modes of operating, along with other means for transmitting torque from motor assembly 600 may be used while remaining within the scope of the present subject matter.

Notably, operation of drive motor 604 generates heat within cabinet 502. If this heat exceeds certain thresholds and is not discharged away from drive motor 604, the operating limits of drive motor 604 may result in restrictions on the performance capabilities and operating envelope of motor assembly 600. As a result, aspects of the present subject matter are directed to systems and features for facilitating cooling of motor assembly 600, e.g., thereby facilitating improved performance of motor assembly 600 and washing machine appliance 500.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A motor system comprising:
    a motor configured to be operated according to at least a portion of an operation cycle specifying at least one target speed for the motor; and
    a controller configured to obtain an estimated winding resistance of the motor, wherein the estimated winding resistance is determined based at least in part on an estimator gain factor, and wherein the estimator gain factor is inversely dependent on a speed of the motor;
    wherein the at least one target speed comprises at least one low speed such that at least a portion of the operation cycle is a low speed portion of the operation cycle, the at least one low speed comprising a speed of less than about 10 percent of a maximum speed of the operation cycle.

2. The motor system of claim 1, wherein the motor is operated according to at least the portion of the operation cycle by providing at least one of a current signal or a voltage signal to the motor to operate the motor at the at least one target speed.

3. The motor system of claim 1, wherein the estimated winding resistance is determined based at least in part on an adaptive resistance estimation function comprising an integral of an integrated term, the integrated term comprising a winding current, a winding current error, and the estimator gain factor.

4. The motor system of claim 3, wherein the integrated term comprises a multiplication of the winding current and the winding current error.

5. The motor system of claim 3, wherein the winding current comprises a winding current vector, wherein the winding current error comprises a winding current error vector, and wherein the integrated term comprises a dot product of the winding current vector and the winding current error.

6. The motor system of claim 3, wherein a denominator of the integrated term comprises an absolute value of the speed of the motor.

7. The motor system of claim 3, wherein a denominator of the integrated term comprises a positive constant.

8. The motor system of claim 3, wherein the winding current is obtained from the motor and transformed to a rotating frame of reference.

9. The motor system of claim 1, wherein the speed of the motor comprises the at least one target speed.

10. The motor system of claim 1, wherein the estimator gain factor is zero when the speed of the motor is greater than a maximum update speed threshold.

11. The motor system of claim 1, wherein the controller is further configured to determine at least one of an estimated speed of the motor and/or estimated angle of the motor based at least in part on the estimated winding resistance.

12. The motor system of claim 1, wherein the controller is further configured to determine a temperature of the motor based at least in part on the estimated winding resistance.

13. A motorized appliance, comprising:
- at least one motorized component; and
- a motor system configured to drive the at least one motorized component; wherein the motor system comprises:
  - a motor configured to be operated according to at least a portion of an operation cycle specifying at least one target speed for the motor; and
  - a controller configured to obtain an estimated winding resistance of the motor, wherein the estimated winding resistance is determined based at least in part on an estimator gain factor, and wherein the estimator gain factor is inversely dependent on a speed of the motor;

wherein the at least one target speed comprises at least one low speed such that at least a portion of the operation cycle is a low speed portion of the operation cycle, the at least one low speed comprising a speed of less than about 10 percent of a maximum speed of the operation cycle.

14. The motorized appliance of claim 13, wherein the motorized appliance comprises a washing machine, and wherein the motorized component comprises a wash basket.

15. The motorized appliance of claim 14, wherein the controller is configured to implement a wash cycle by the washing machine.

* * * * *